United States Patent
Nishida et al.

(10) Patent No.: US 9,643,881 B2
(45) Date of Patent: May 9, 2017

(54) GLASS COMPOSITION FOR GLASS FIBER, GLASS FIBER, AND METHOD FOR PRODUCING GLASS FIBER

(71) Applicant: NIPPON ELECTRIC GLASS CO., LTD., Otsu-shi, Shiga (JP)

(72) Inventors: Shinsaku Nishida, Otsu (JP); Hiroshi Sawasato, Otsu (JP)

(73) Assignee: NIPPON ELECTRIC GLASS CO., LTD., Otsu-shi, Shiga (JP)

( * ) Notice: Subject to any disclaimer, the term of this patent is extended or adjusted under 35 U.S.C. 154(b) by 0 days.

(21) Appl. No.: 14/434,421

(22) PCT Filed: Oct. 23, 2013

(86) PCT No.: PCT/JP2013/078698
§ 371 (c)(1),
(2) Date: Apr. 9, 2015

(87) PCT Pub. No.: WO2014/065321
PCT Pub. Date: May 1, 2014

(65) Prior Publication Data
US 2015/0266769 A1  Sep. 24, 2015

(30) Foreign Application Priority Data
Oct. 25, 2012  (JP) ................. 2012-235269

(51) Int. Cl.
| | |
|---|---|
| *C03C 3/076* | (2006.01) |
| *C03C 13/00* | (2006.01) |
| *C03C 3/087* | (2006.01) |
| *C03C 4/20* | (2006.01) |
| *C03B 37/02* | (2006.01) |
| *C03C 3/078* | (2006.01) |

(52) U.S. Cl.
CPC .............. *C03C 3/076* (2013.01); *C03B 37/02* (2013.01); *C03C 3/078* (2013.01); *C03C 3/087* (2013.01); *C03C 4/20* (2013.01); *C03C 13/002* (2013.01)

(58) Field of Classification Search
CPC ......... C03C 3/076; C03C 3/078; C03C 3/087; C03C 13/00; C03C 13/002; C03C 4/20; C03B 37/02
See application file for complete search history.

(56) References Cited

U.S. PATENT DOCUMENTS

| | | | |
|---|---|---|---|
| 3,861,926 | A | 1/1975 | Irlam et al. |
| 3,969,121 | A | 7/1976 | Atkinson |
| RE29,388 | E | 9/1977 | Atkinson |
| 4,345,037 | A | 8/1982 | Fyles et al. |
| 2009/0305053 | A1 | 12/2009 | Lecomte et al. |

FOREIGN PATENT DOCUMENTS

| | | |
|---|---|---|
| JP | S49-40126 B1 | 10/1974 |
| JP | S49-113805 A | 10/1974 |
| JP | S50-46712 A | 4/1975 |
| JP | S56-134534 A | 10/1981 |
| JP | S58-167444 A | 10/1983 |
| JP | H09-156957 A | 6/1997 |
| JP | 2009-513470 A | 4/2009 |

OTHER PUBLICATIONS

Machine Translation of JP 9-156957 A Jun. 17, 1997.*

* cited by examiner

*Primary Examiner* — Elizabeth A Bolden
(74) *Attorney, Agent, or Firm* — Drinker Biddle & Reath LLP

(57) ABSTRACT

Provided is a glass composition for a glass fiber, which has excellent alkali resistance, acid resistance, and hydrolytic resistance, is useful as a reinforcing material for composite materials such as calcium silicate board and GRC and as a corrosion-resistant material for battery separators or the like, and has a low glass drawing temperature and liquidus temperature of the glass and thus which is excellent in productivity. The glass composition comprises, in mass % on an oxide base, 50 to 65% of $SiO_2$, 0 to 5% of $Al_2O_3$, 0 to 10% of CaO, 10 to 20% of $Li_2O+Na_2O+K_2O$, 0 to 5% of $Li_2O$, 10 to 20% of $Na_2O$, 0 to 5% of $K_2O$, 5 to 10% of $TiO_2$, and 10 to 20% of $ZrO_2$ as a glass composition.

10 Claims, No Drawings

GLASS COMPOSITION FOR GLASS FIBER, GLASS FIBER, AND METHOD FOR PRODUCING GLASS FIBER

TECHNICAL FIELD

The present invention relates to a glass composition for a glass fiber excellent in corrosion resistance, a glass fiber thereof, and a method for producing a glass fiber thereof. Particularly, it relates to a glass composition for a glass fiber which is suitable as a reinforcing material for calcium silicate board, GRC (glass reinforced concrete), and the like and as a material such as a battery separator or asbestos substitute for which corrosion resistance is required, and which is excellent in productivity, a glass fiber thereof, and a method for producing a glass fiber thereof.

BACKGROUND ART

Heretofore, as a reinforcing material for GRC, an $SiO_2$—$ZrO_2$—$R_2O$ (R is Li, Na, K)-based $ZrO_2$-containing alkali-resistant glass fiber as described in Patent Document 1 has been used.

Moreover, the glass fiber has been also used as a reinforcing material for calcium silicate board and as a corrosion-resistant material for battery separators or the like.

The glass fiber as mentioned above is, for example, used in a fiber form, which is obtained by continuously forming and drawing a molten glass into a fiber using a noble metal-made bushing apparatus. Incidentally, the structure of the bushing has a container shape for the purpose of retaining the molten glass and a large number of nozzles are disposed on the bottom in the vertical direction. The glass fiber is formed by drawing the molten glass adjusted to a temperature around a forming temperature (a temperature that is also called a drawing temperature and at which the viscosity of the glass becomes about $10^3$ dPa·s) from the nozzle on the bushing bottom in a fiber form.

CITED REFERENCES

Patent Documents

Patent Document 1: JP-B-49-40126
Patent Document 2: JP-T-2009-513470

DISCLOSURE OF THE INVENTION

Problems to be Solved by the Invention

A calcium silicate board is prepared in a given shape by kneading a glass fiber cut into a given length together with Portland cement, silica powder, pulp, and the like in a mixer and subsequently pouring the kneaded one into a mold. In the case where the calcium silicate board is prepared by an extrusion molding method, an autoclave treatment is preformed. Since the alkali components such as NaOH, KOH, and $Ca(OH)_2$ in the Portland cement tend to deteriorate the glass fiber on this occasion, a glass fiber excellent in alkali resistance has been needed.

Furthermore, also in uses other than GRC, for the purpose of suppressing deterioration of the glass fiber, excellent alkali resistance has been needed in some cases.

From the standpoint of improving the alkali resistance, as described in Patent Document 1, it is effective to contain a large amount of $ZrO_2$ in the glass composition. However, when a large amount of $ZrO_2$ is contained in the glass composition, the drawing temperature and liquidus temperature of the glass become high.

When the drawing temperature and liquidus temperature of the glass are high, it is necessary to melt the glass at high temperature, so that a noble metal-made bushing apparatus is severely damaged. As a result, there arises a problem that frequency of exchanging the bushing apparatus increases to increase production costs.

Patent Document 2 discloses a glass composition which maintains the alkali resistance by reducing $ZrO_2$ and increasing the content of CaO. However, even in the invention of Patent Document 2, the drawing temperature and liquidus temperature of the glass are still high.

As mentioned above, it has been difficult to obtain a glass composition for a glass fiber, which has excellent alkali resistance and low drawing temperature and liquidus temperature of the glass, and which is excellent in productivity.

The present invention has been made in consideration of the above circumstances and an object thereof is to provide a glass composition for a glass fiber, which has excellent alkali resistance, acid resistance and hydrolytic resistance, is useful as a reinforcing material for composite materials such as calcium silicate board and GRC and as a corrosion-resistant material for battery separators or the like, and also has a low glass drawing temperature and liquidus temperature of the glass and thus is excellent in productivity, a glass fiber thereof, and a method for producing a glass fiber thereof.

Means for Solving the Problems

As a result of extensive studies, the present inventors have found that the above problems can be solved by strictly defining a glass composition as follows, and this finding is proposed as the present invention.

That is, a glass composition for a glass fiber according to the invention comprises, in mass % on an oxide base, 50 to 65% of $SiO_2$, 0 to 5% of $Al_2O_3$, 0 to 10% of CaO, 10 to 20% of $Li_2O+Na_2O+K_2O$, 0 to 5% of $Li_2O$, 10 to 20% of $Na_2O$, 0 to 5% of $K_2O$, 5 to 10% of $TiO_2$, and 10 to 20% of $ZrO_2$ as a glass composition. The "$Li_2O+Na_2O+K_2O$" herein means the total content of $Li_2O$, $Na_2O$, and $K_2O$.

Moreover, a glass composition for a glass fiber according to the invention is preferably one wherein the content of $K_2O$ is less than 0.5%.

Furthermore, a glass composition for a glass fiber according to the invention is preferably one wherein the total content of $SiO_2$, $Al_2O_3$, CaO, $Li_2O$, $Na_2O$, $K_2O$, $TiO_2$, and $ZrO_2$ is 98% or more.

In addition, a glass composition for a glass fiber according to the invention is preferably one wherein a drawing temperature is 1280° C. or lower. In the invention, the "drawing temperature" means a temperature at which the viscosity of the glass becomes $10^3$ dPa·s.

Moreover, a glass composition for a glass fiber according to the invention is preferably one wherein a weight loss is 3% or less when glass grains with a same weight of glass density, with a particle size between 300 and 500 μm, are immersed in 100 ml of 10 mass % NaOH solution at 80° C. for 16 hours.

A glass composition for a glass fiber according to the invention is preferably one wherein a weight loss is 3% or less when glass grains with a same weight of glass density, with a particle size between 300 and 500 μm, are immersed in 100 ml of 10 mass % HCl solution at 80° C. for 16 hours.

A glass composition for a glass fiber according to the invention is preferably one wherein an alkali elution amount in accordance with JIS R3502 is 0.40 mg or less.

A glass composition for a glass fiber according to the invention is preferably one wherein a difference between the drawing temperature and the liquidus temperature is 80° C. or more.

A glass fiber according to the invention comprises a glass composition for a glass fiber as described above.

A method for producing a glass fiber according to the invention includes:

melting a raw material batch formulated so as to be a glass comprising, in mass % on an oxide base, 50 to 65% of $SiO_2$, 0 to 5% of $Al_2O_3$, 0 to 10% of CaO, 10 to 20% of $Li_2O+Na_2O+K_2O$, 0 to 5% of $Li_2O$, 10 to 20% of $Na_2O$, 0 to 5% of $K_2O$, 5 to 10% of $TiO_2$, and 10 to 20% of $ZrO_2$ as a glass composition, in a glass melting furnace and continuously drawing the molten glass from a bushing to form it into a fiber.

Effect of the Invention

Since a glass composition for a glass fiber according to the invention contains a large amount of $TiO_2$, it has excellent alkali resistance, acid resistance, and hydrolytic resistance. Accordingly, a glass fiber made of the glass composition for a glass fiber according to the invention is useful as a reinforcing material for composite materials such as calcium silicate board and GRC and as a corrosion-resistant material for battery separators or the like. Furthermore, since a glass composition for a glass fiber according to the invention has a low glass drawing temperature and liquidus temperature of the glass, the composition is excellent in productivity.

EMBODIMENTS FOR CARRYING OUT THE INVENTION

The following will describe glass compositions for a glass fiber according to embodiments of the invention. First, the actions of components constituting a glass according to the invention and the reasons for defining the contents thereof as described above will be described. Incidentally, in the explanation of the content range of each component, the representation of % refers to mass % and the numerical range represented using "to" means a range containing the numerical values described before and after "to" as the lower limit and the upper limit.

$SiO_2$ is a major component forming the network former of a glass. Also, it is a component improving the acid resistance of the glass. On the other hand, when $SiO_2$ is contained too much, the viscosity of the glass increases and also the alkali resistance of the glass is lowered. The content of $SiO_2$ is 50 to 65%, preferably 55 to 65%, and more preferably 57 to 61%. When the content of $SiO_2$ is less than 50%, the mechanical strength of the glass is prone to decrease. Also, the acid resistance of the glass decreases. When the content of $SiO_2$ is more than 65%, the viscosity of the glass becomes high, resulting in an increase in energy necessary for melting the glass. Moreover, the damage of the noble metal-made bushing becomes severe and frequency of exchange becomes high, so that the production cost increases. Also, the alkali resistance of the glass decreases.

$Al_2O_3$ is a component enhancing the chemical durability and mechanical strength of the glass. On the other hand, $Al_2O_3$ is also a component raising the liquidus temperature of the glass to a large extent. The content of $Al_2O_3$ is 0 to 5%, preferably 0 to 3%, and more preferably 0 to 1%. When the content of $Al_2O_3$ is more than 5%, the liquidus temperature of the glass becomes high, resulting in a decrease in productivity.

CaO is a component improving the alkali resistance, particularly cement resistance and also reducing the viscosity of the glass. On the other hand, CaO is a component raising the liquidus temperature of the glass when CaO is contained too much. The content of CaO is 0 to 10% and preferably 0 to 7%. When the content of CaO is more than 10%, the liquidus temperature of the glass becomes high, resulting in a decrease in productivity.

$Li_2O$, $Na_2O$, and $K_2O$, which are alkali metal oxides, are components reducing the viscosity of the glass and enhancing the meltability and the formability. On the other hand, the alkali metal oxides are components decreasing the hydrolytic resistance of the glass when they are contained too much. The total content of $Li_2O$, $Na_2O$, and $K_2O$ ($Li_2O+Na_2O+K_2O$) is 10 to 20%, preferably 10 to 18%, and more preferably 12 to 18%. When $Li_2O+Na_2O+K_2O$ is less than 10%, the viscosity of the glass becomes high, resulting in an increase in energy necessary for melting the glass. Moreover, the damage of the noble metal-made bushing becomes severe and the frequency of exchange becomes high, so that the production cost increases. When $Li_2O+Na_2O+K_2O$ is more than 20%, the hydrolytic resistance of the glass decreases.

$Li_2O$ is a component reducing the viscosity of the glass and enhancing the meltability and the formability. The content of $Li_2O$ is 0 to 5% and preferably 0 to 3%. When the content of $Li_2O$ is more than 5%, crystals containing Li are prone to precipitate from the molten glass. Incidentally, since $Li_2O$ is high in cost of the raw material, the content is preferably small.

$Na_2O$ is a component enhancing the meltability and the formability of the glass by reducing the viscosity of the glass. On the other hand, $Na_2O$ raises the liquidus temperature of the glass to a large extent and decreases the hydrolytic resistance of the glass when $Na_2O$ is contained too much. The content of $Na_2O$ is 10 to 20%, preferably 10 to 18%, and more preferably 12 to 18%. When the content of $Na_2O$ is less than 10%, the viscosity of the glass becomes high, resulting in an increase in energy necessary for melting the glass. Moreover, the damage of the noble metal-made bushing becomes severe and the frequency of exchange becomes high, so that the production cost increases. When the content of $Na_2O$ is more than 20%, the liquidus temperature of the glass becomes high, resulting in a decrease in productivity. Also, the hydrolytic resistance of the glass decreases.

$K_2O$ is a component enhancing the meltability and the formability of the glass by reducing the viscosity of the glass. On the other hand, $K_2O$ raises the liquidus temperature of the glass when $K_2O$ is contained too much. The content of $K_2O$ is 0 to 5%, preferably 0 to 3%, more preferably 0 to 1%, and further preferably 0 to less than 0.5%. Incidentally, from the standpoint of improving the productivity, it is preferable to contain $K_2O$ as an essential component. In that case, $K_2O$ is desirably contained in an amount of 0.1 to 5%, 0.15 to 3%, and particularly 0.2 to 2%.

$TiO_2$ is a component improving the hydrolytic resistance and alkali resistance of the glass and also remarkably lowering the liquidus temperature of the glass by lowering the drawing temperature. On the other hand, $TiO_2$ raises the liquidus temperature of the glass to a large extent when $TiO_2$ is contained too much. The content of $TiO_2$ is 5 to 10% and preferably 5 to 9%. When the content of $TiO_2$ is less than 5%, the hydrolytic resistance and alkali resistance of the glass decrease. Also, the drawing temperature and the liquidus temperature are raised, resulting in a decrease in productivity. When the content of $TiO_2$ is more than 10%, the liquidus temperature of the glass becomes high, resulting in a decrease in productivity.

$ZrO_2$ is a component improving the alkali resistance, acid resistance, and hydrolytic resistance of the glass. On the other hand, $ZrO_2$ elevates the liquidus temperature of the glass when $ZrO_2$ is contained too much. The content of $ZrO_2$ is 10 to 20%, preferably 12 to 20%, and more preferably 15 to 20%. When the content of $ZrO_2$ is less than 10%, the alkali resistance, acid resistance, and hydrolytic resistance of the glass decrease. When the content of $ZrO_2$ is more than 20%, the liquidus temperature of the glass becomes high, resulting in a decrease in productivity.

Moreover, a glass composition for a glass fiber according to the invention may contain components other than the above-described components ($SiO_2$, $Al_2O_3$, CaO, $Li_2O$, $Na_2O$, $K_2O$, $TiO_2$, and $ZrO_2$). However, a composition is desirably controlled so that the total content of the above-described components is 98% or more, particularly 99% or more. The reason is that, when the total content of these components is less than 98%, a decrease in properties as a product through a decrease in alkali resistance, acid resistance, and hydrolytic resistance, a decrease in productivity through elevation of the liquidus temperature, and the like may sometimes occur due to unintentional mixing-in of different kinds of components.

As the other components other than the above-described components, for example, minute components such as $H_2$, $CO_2$, CO, $H_2O$, He, Ne, Ar, and $N_2$ may be contained each in an amount of up to 0.1%. In addition, noble metal elements such as Pt, Rh, and Au may be added into the glass in an amount of up to 500 ppm.

Further, in order to improve the alkali resistance, acid resistance, hydrolytic resistance, and liquidus temperature, $B_2O_3$, MgO, SrO, BaO, ZnO, $Fe_2O_3$, $P_2O_5$, $Cr_2O_3$, $Sb_2O_3$, $SO_3$, MnO, $SnO_2$, $CeO_2$, $Cl_2$, $La_2O_3$, $WO_3$, $Nb_2O_5$, $Y_2O_3$, and the like may be contained in an amount of up to 2% as a total content.

A glass composition for a glass fiber according to the invention is preferably one wherein a weight loss is 3% or less, particularly 2% or less, and further 1.5% or less when glass grains with the same weight of glass density, with the particle size between 300 and 500 μm, are immersed in 100 ml of 10 mass % NaOH solution at 80° C. for 16 hours. When the weight loss of the glass resulting from the alkali resistance test is more than 3%, the alkali resistance of the glass decreases and reliability as a reinforcing material of composite materials such as calcium silicate board and GRC may sometimes decrease.

A glass composition for a glass fiber according to the invention is preferably one wherein a weight loss is 3% or less, particularly 2% or less, and further 1.5% or less when glass grains with the same weight of glass density, with the particle size between 300 and 500 μm, are immersed in 100 ml of 10 mass % HCl solution at 80° C. for 16 hours. When the weight loss of the glass resulting from the acid resistance test is more than 3%, the acid resistance of the glass decreases and reliability as a corrosion-resistant material of battery separators or the like decreases.

A glass composition for a glass fiber according to the invention is preferably one wherein an alkali elution amount is 0.40 mg or less, particularly 0.35 mg or less, and further 0.30 mg or less. When the alkali elution amount is more than 0.40 mg, alkali components may be eluted from the glass during an autoclave treatment and the glass may be prone to deteriorate.

A glass composition for a glass fiber according to the invention has a drawing temperature of 1280° C. or lower, particularly 1260° C. or lower. When the drawing temperature is higher than 1280° C., the drawing should be performed at high temperature, so that the damage of the noble metal-made bushing becomes severe and the frequency of exchange becomes high, and hence the production cost may sometimes increase.

A glass composition for a glass fiber according to the invention has a difference between the drawing temperature and the liquidus temperature of 80° C. or more, particularly 90° C. or more. When the difference between the drawing temperature and the liquidus temperature is less than 80° C., the productivity may sometimes decrease.

The following will describe a method for producing a glass fiber according to the invention with reference to Direct Melt method (DM method) as an example. Incidentally, the invention is not limited to the following method and there can be adopted, for example, a so-called indirect molding method (MM method: marble melt method) in which a glass material for a fiber formed into a marble shape is re-melted and spun in a bushing apparatus. This method is suitable for multi-kind and small-quantity production.

First, glass raw materials are mixed so as to be a glass comprising, in mass % on an oxide base, 50 to 65% of $SiO_2$, 0 to 5% of $Al_2O_3$, 0 to 10% of CaO, 10 to 20% of $Li_2O+Na_2O+K_2O$, 0 to 5% of $Li_2O$, 10 to 20% of $Na_2O$, 0 to 5% of $K_2O$, 5 to 10% of $TiO_2$, and 10 to 20% of $ZrO_2$. Incidentally, a glass cullet may be used as a part or all part of the glass raw materials. The reason why the content of each component is as above is as already mentioned and thus the explanations are omitted herein.

Then, the mixed glass raw material batch is charged into a glass melting furnace and is vitrified, melted, and homogenized. The melting temperature is suitably about 1400 to 1600° C.

Subsequently, the molten glass is spun to form a glass fiber. In detail, the molten glass is supplied to a bushing. The molten glass supplied to the bushing is continuously drawn in a filament form from a large number of bushing nozzles provided on the bottom. Various treating agents are applied to the thus drawn monofilaments and the resulting monofilaments are bundled every given number thereof to obtain a glass fiber.

The thus formed glass fiber of the invention is processed into a chopped strand, a yarn, a roving, or the like and is used for various applications.

Incidentally, the chopped strand is one obtained by cutting a glass fiber (strand) resulting from the bundling of the glass monofilaments into a given length. The yarn is one obtained by twisting the strand. The roving is one obtained by doubling a plurality of strands and winding the doubled one in a cylindrical form.

EXAMPLES

The following will describe the invention in detail based on the examples.

Tables 1 to 6 show examples of the invention (Samples No. 1 to 23 and 25 to 30) and a comparative example (Sample No. 24).

TABLE 1

| | | Sample No. | | | | |
|---|---|---|---|---|---|---|
| | | 1 | 2 | 3 | 4 | 5 |
| Glass composition (mass %) | $SiO_2$ | 58.43 | 58.94 | 58.96 | 58.95 | 58.93 |
| | $Al_2O_3$ | 0.2 | 0.2 | 0.2 | 0.2 | 0.2 |
| | CaO | 0.8 | 0.8 | 2.8 | 2.8 | 3.8 |
| | $Li_2O$ | | | | | |
| | $Na_2O$ | 16.2 | 16.2 | 14.7 | 15.2 | 14.7 |
| | $K_2O$ | | | | | |
| | $ZrO_2$ | 16.5 | 16.5 | 16.5 | 16.5 | 16.5 |
| | $Fe_2O_3$ | 0.04 | 0.03 | 0.02 | 0.03 | 0.04 |
| | $TiO_2$ | 7.8 | 7.3 | 6.8 | 6.3 | 5.8 |
| | $SO_3$ | 0.03 | 0.03 | 0.02 | 0.02 | 0.03 |
| | $Li_2O + Na_2O + K_2O$ | 16.2 | 16.2 | 14.7 | 15.2 | 14.7 |
| Alkali resistance (%) | | 0.9 | 0.9 | 0.8 | 0.9 | 0.9 |
| Acid resistance (%) | | 0.5 | 0.5 | 0.4 | 0.4 | 0.4 |
| Alkali elution amount (mg) | | 0.25 | 0.24 | 0.18 | 0.21 | 0.22 |
| Drawing temperature (° C.) | | 1244 | 1248 | 1249 | 1251 | 1252 |
| Liquidus temperature (° C.) | | 1112 | 1117 | 1107 | 1121 | 1126 |
| Drawing temperature − Liquidus temperature (° C.) | | 132 | 131 | 142 | 130 | 126 |

TABLE 2

| | | Sample No. | | | | |
|---|---|---|---|---|---|---|
| | | 6 | 7 | 8 | 9 | 10 |
| Glass composition (mass %) | $SiO_2$ | 58.94 | 57.93 | 58.43 | 57.93 | 59.06 |
| | $Al_2O_3$ | 0.2 | 0.2 | 0.2 | 0.2 | 0.1 |
| | CaO | 2.5 | 0.8 | 0.8 | 2.8 | 1.8 |
| | $Li_2O$ | | | 0.5 | | |
| | $Na_2O$ | 15.8 | 16.7 | 15.7 | 14.7 | 14.7 |
| | $K_2O$ | | | | | |
| | $ZrO_2$ | 16.5 | 16.5 | 16.5 | 16.5 | 16.5 |
| | $Fe_2O_3$ | 0.04 | 0.05 | 0.03 | 0.04 | 0.03 |
| | $TiO_2$ | 6.0 | 7.8 | 7.8 | 7.8 | 7.8 |
| | $SO_3$ | 0.02 | 0.02 | 0.04 | 0.03 | 0.01 |
| | $Li_2O + Na_2O + K_2O$ | 15.8 | 16.7 | 16.2 | 14.7 | 14.7 |
| Alkali resistance (%) | | 0.9 | 0.9 | 0.9 | 0.9 | 0.8 |
| Acid resistance (%) | | 0.5 | 0.5 | 0.5 | 0.5 | 0.5 |
| Alkali elution amount (mg) | | 0.23 | 0.26 | 0.23 | 0.2 | 0.21 |
| Drawing temperature (° C.) | | 1244 | 1232 | 1243 | 1234 | 1254 |
| Liquidus temperature (° C.) | | 1153 | 1124 | 1124 | 1135 | 1090 |
| Drawing temperature − Liquidus temperature (° C.) | | 91 | 108 | 119 | 99 | 164 |

TABLE 3

| | | Sample No. | | | | |
|---|---|---|---|---|---|---|
| | | 11 | 12 | 13 | 14 | 15 |
| Glass composition (mass %) | $SiO_2$ | 57.95 | 57.94 | 57.86 | 58.47 | 58.45 |
| | $Al_2O_3$ | 0.2 | 0.2 | 0.3 | 0.2 | 0.2 |
| | CaO | 1.8 | 2.8 | 2.8 | 2.8 | 1.8 |
| | $Li_2O$ | | | | | |
| | $Na_2O$ | 15.7 | 15.2 | 15.7 | 15.2 | 16.2 |
| | $K_2O$ | | | | | |
| | $ZrO_2$ | 16.5 | 16.5 | 16.5 | 16.5 | 16.5 |
| | $Fe_2O_3$ | 0.04 | 0.02 | 0.01 | 0.03 | 0.03 |
| | $TiO_2$ | 7.8 | 7.3 | 6.8 | 6.8 | 6.8 |
| | $SO_3$ | 0.01 | 0.04 | 0.03 | | 0.02 |
| | $Li_2O + Na_2O + K_2O$ | 15.7 | 15.2 | 15.7 | 15.2 | 16.2 |
| Alkali resistance (%) | | 0.9 | 0.9 | 0.9 | 0.9 | 0.9 |
| Acid resistance (%) | | 0.4 | 0.5 | 0.5 | 0.5 | 0.4 |
| Alkali elution amount (mg) | | 0.23 | 0.22 | 0.23 | 0.22 | 0.27 |
| Drawing temperature (° C.) | | 1236 | 1241 | 1228 | 1244 | 1242 |
| Liquidus temperature (° C.) | | 1133 | 1146 | 1135 | 1137 | 1148 |
| Drawing temperature − Liquidus temperature (° C.) | | 103 | 95 | 93 | 107 | 94 |

TABLE 4

| | | Sample No. | | | | |
|---|---|---|---|---|---|---|
| | | 16 | 17 | 18 | 19 | 20 |
| Glass composition (mass %) | $SiO_2$ | 58.95 | 58.95 | 58.85 | 58.94 | 58.93 |
| | $Al_2O_3$ | 0.2 | 0.2 | 0.2 | 0.2 | 0.2 |
| | CaO | 2.3 | 1.8 | 1.3 | 0.8 | 2.3 |
| | $Li_2O$ | | | | | |
| | $Na_2O$ | 15.7 | 16.2 | 16.7 | 17.2 | 16.2 |
| | $K_2O$ | | | 0.4 | | |
| | $ZrO_2$ | 16.5 | 16.5 | 16.2 | 16.5 | 16.5 |
| | $Fe_2O_3$ | 0.02 | 0.03 | 0.02 | 0.04 | 0.04 |
| | $TiO_2$ | 6.3 | 6.3 | 6.3 | 6.3 | 5.8 |
| | $SO_3$ | 0.03 | 0.02 | 0.03 | 0.02 | 0.03 |
| | $Li_2O + Na_2O + K_2O$ | 15.7 | 16.2 | 17.1 | 17.2 | 16.2 |
| Alkali resistance (%) | | 0.8 | 0.9 | 0.9 | 0.8 | 0.9 |
| Acid resistance (%) | | 0.5 | 0.5 | 0.4 | 0.5 | 0.5 |
| Alkali elution amount (mg) | | 0.24 | 0.26 | 0.28 | 0.3 | 0.24 |
| Drawing temperature (° C.) | | 1252 | 1253 | 1248 | 1249 | 1249 |
| Liquidus temperature (° C.) | | 1143 | 1136 | 1139 | 1134 | 1145 |
| Drawing temperature − Liquidus temperature (° C.) | | 109 | 117 | 109 | 115 | 104 |

TABLE 5

| | | Sample No. | | | | |
|---|---|---|---|---|---|---|
| | | 21 | 22 | 23 | 24 | 25 |
| Glass composition (mass %) | $SiO_2$ | 58.95 | 58.46 | 57.93 | 61.95 | 58.05 |
| | $Al_2O_3$ | 0.2 | 0.2 | 0.2 | 0.4 | 0.2 |
| | CaO | 3.3 | 0.8 | 0.8 | 5.8 | 0.7 |
| | $Li_2O$ | | | | | 0.4 |
| | $Na_2O$ | 15.2 | 15.7 | 16.2 | 14.8 | 14.7 |
| | $K_2O$ | | | | | 1.7 |
| | $ZrO_2$ | 16.5 | 16.5 | 16.5 | 16.7 | 17.5 |
| | $Fe_2O_3$ | 0.03 | 0.02 | 0.04 | 0.03 | 0.04 |
| | $TiO_2$ | 5.8 | 8.3 | 8.3 | 0.3 | 6.7 |
| | $SO_3$ | 0.02 | 0.02 | 0.03 | 0.02 | 0.01 |
| | $Li_2O + Na_2O + K_2O$ | 15.2 | 15.7 | 16.2 | 14.8 | 16.8 |
| Alkali resistance (%) | | 0.9 | 0.8 | 0.9 | 0.8 | 0.6 |
| Acid resistance (%) | | 0.4 | 0.5 | 0.5 | 0.5 | 0.2 |
| Alkali elution amount (mg) | | 0.23 | 0.22 | 0.23 | 0.23 | 0.26 |
| Drawing temperature (° C.) | | 1248 | 1244 | 1234 | 1290 | 1246 |
| Liquidus temperature (° C.) | | 1150 | 1096 | 1136 | 1188 | 1110 |
| Drawing temperature − Liquidus temperature (° C.) | | 98 | 148 | 98 | 102 | 136 |

TABLE 6

| | | Sample No. | | | | |
|---|---|---|---|---|---|---|
| | | 26 | 27 | 28 | 29 | 30 |
| Glass composition (mass %) | $SiO_2$ | 57.25 | 57.75 | 57.15 | 56.95 | 56.95 |
| | $Al_2O_3$ | 0.2 | 0.2 | 0.2 | 0.2 | 0.2 |
| | CaO | 1.5 | 1.3 | 1.3 | 0.7 | 1.3 |
| | $Li_2O$ | | 0.1 | | 0.2 | |
| | $Na_2O$ | 15.7 | 15.5 | 15.5 | 15.7 | 15.5 |

TABLE 6-continued

| | Sample No. | | | | |
|---|---|---|---|---|---|
| | 26 | 27 | 28 | 29 | 30 |
| $K_2O$ | | 0.2 | 0.5 | 0.9 | 1.3 |
| $ZrO_2$ | 17.5 | 17.5 | 17.5 | 17.5 | 17.5 |
| $Fe_2O_3$ | 0.04 | 0.04 | 0.04 | 0.04 | 0.04 |
| $TiO_2$ | 7.8 | 7.4 | 7.8 | 7.0 | 7.2 |
| $SO_3$ | 0.01 | 0.01 | 0.01 | 0.01 | 0.01 |
| $Li_2O + Na_2O + K_2O$ | 15.7 | 15.8 | 16.0 | 16.8 | 16.8 |
| Alkali resistance (%) | 0.6 | unmeasured | 0.6 | 0.4 | unmeasured |
| Acid resistance (%) | 0.2 | unmeasured | 0.2 | 0.3 | unmeasured |
| Alkali elution amount (mg) | 0.21 | unmeasured | 0.2 | 0.26 | unmeasured |
| Drawing temperature (° C.) | 1245 | unmeasured | 1250 | 1250 | unmeasured |
| Liquidus temperature (° C.) | 1130 | unmeasured | 1128 | 1130 | unmeasured |
| Drawing temperature − Liquidus temperature (° C.) | 115 | unmeasured | 123 | 120 | unmeasured |

Each of the samples in the tables was prepared as follows.

First, various glass raw materials such as natural raw materials and chemical raw materials were weighed and mixed so as to afford each of the glass compositions in the tables, thereby preparing each glass batch. Next, after the glass batch was charged into a crucible made from a platinum-rhodium alloy, the batch was heated at 1550° C. for 5 hours in an indirect heating electric furnace to obtain a molten glass. Incidentally, in order to obtain a homogeneous molten glass, the molten glass was stirred plural times using a heat-resistant stirring rod during the heating. Subsequently, the obtained molten glass was poured into a refractory casting mold to form a plate-like glass and then an annealing treatment (heating was continued at a temperature 30 to 50° C. higher than the temperature at $10^{13}$ dPa·s for 30 minutes and then temperature was lowered at 1° C./minute in the temperature zone from the annealing point to the strain point) was performed in an annealing furnace. For each obtained sample, the alkali resistance, acid resistance, alkali elution amount, drawing temperature, and liquidus temperature were measured.

The alkali resistance was measured as follows. First, the above-described plate-like glass sample was crushed into the size of 300 to 500 μm in diameter, weighed the same weight of glass density, and subsequently the glass was immersed in 100 ml of a 10 mass % NaOH solution and shaken under conditions of 80° C. and 16 hours. Thereafter, the weight loss of the glass sample was measured. The smaller the value is, the more excellent the alkali resistance is.

The acid resistance was measured as follows. First, the above-described plate-like glass sample was crushed into the size of 300 to 500 μm in diameter, weighed the same weight of glass density, and subsequently the glass was immersed in 100 ml of a 10 mass % HCl solution and shaken under conditions of 80° C. and 16 hours. Thereafter, the weight loss of the glass sample was measured. The smaller the value is, the more excellent the acid resistance is.

The alkali elution amount was measured by a method in accordance with JIS R3502 (1995). The smaller the value is, the more excellent the hydrolytic resistance is.

The measurement of the drawing temperature was performed as follows. First, the plate-like glass sample was crushed into an appropriate size and then was charged into an alumina-made crucible so that air bubbles were not involved as far as possible. Subsequently, the alumina crucible was heated to make the sample a molten liquid state and the viscosity of the glass was determined at each of a plurality of temperatures by a platinum ball pulling-up method. Thereafter, a viscosity curve was made from the obtained plural measured values and a temperature at which the viscosity reached $10^3$ dPa·s was calculated by interpolation.

The measurement of the liquidus temperature was performed as follows. First, the plate-like glass sample was crushed and the crushed sample adjusted so as to have a grain size ranging 300 to 500 μm was filled into a refractory container in a state that the sample had an appropriate bulk density. Subsequently, the refractory container was placed in an indirect heating type temperature gradient furnace whose maximum temperature was set at 1250° C. and allowed to stand, and then a heating operation was performed in an air atmosphere for 16 hours. Thereafter, the sample was taken out along with the refractory container from the temperature gradient furnace and, after cooling to room temperature, the liquidus temperature was specified by means of a polarizing microscope.

The difference between the drawing temperature and the liquidus temperature was calculated from the values of the both.

As is clear from Tables 1 to 6, each of the samples of the examples had weight decrease ratios, as indices of alkali resistance and acid resistance, of both 3% or less, an alkali elution amount of 0.40 mg or less, a drawing temperature of 1280° C. or lower, and a difference between the drawing temperature and the liquidus temperature of 80° C. or more.

Contrarily, the sample No. 24 had a drawing temperature of higher than 1280° C.

While the invention has been described in detail and with reference to specific embodiments thereof, it will be apparent to one skilled in the art that various changes and modifications can be made therein without departing from the spirit and scope thereof.

The present application is based on Japanese Patent Application No. 2012-235269 filed on Oct. 25, 2012, and the contents are incorporated herein by reference.

INDUSTRIAL APPLICABILITY

A glass composition according to the invention can be suitably used as a glass fiber useful as a reinforcing material for composite materials such as calcium silicate board and GRC and as a corrosion-resistant material for battery separators or the like.

The invention claimed is:

1. A glass composition for a glass fiber comprising, in mass % on an oxide base, 50 to 65% of $SiO_2$, 0 to 5% of $Al_2O_3$, 0 to 10% of CaO, 12 to 20% of $Li_2O+Na_2O+K_2O$, 0 to 5% of $Li_2O$, 12 to 18% of $Na_2O$, 0 to 1.7% of $K_2O$, 5 to 8.3% of $TiO_2$, 16.5 to 20% of $ZrO_2$, and wherein a total content of $SiO_2$, $Al_2O_3$, CaO, $Li_2O$, $Na_2O$, $K_2O$, $TiO_2$, and $ZrO_2$ is 98% or more, and wherein a difference between a drawing temperature and a liquidus temperature is 91° C. or more.

2. The glass composition for a glass fiber according to claim 1, wherein a content of $K_2O$ is less than 0.5%.

3. The glass composition for a glass fiber according to claim 1, wherein a total content of $SiO_2$, $Al_2O_3$, CaO, $Li_2O$, $Na_2O$, $K_2O$, $TiO_2$, and $ZrO_2$ is 99% or more.

4. The glass composition for a glass fiber according to claim 1, wherein a drawing temperature is 1280° C. or lower.

5. The glass composition for a glass fiber according to claim 1, wherein a glass weight loss is 3% or less when glass grains with a same weight of glass density, with particle size between 300 and 500 µm, are immersed in 100 ml of 10 mass % NaOH solution at 80° C. for 16 hours.

6. The glass composition for a glass fiber according to claim 1, wherein a glass weight loss is 3% or less when glass grains with a same weight of glass density, with particle size between 300 and 500 µm, are immersed in 100 ml of 10 mass % HCl solution at 80° C. for 16 hours.

7. The glass composition for a glass fiber according to claim 1, wherein an alkali elution amount in accordance with JIS R3502 is 0.40 mg or less.

8. The glass composition for a glass fiber according to claim 1, wherein a difference between a drawing temperature and a liquidus temperature is 93° C. or more.

9. A glass fiber comprising a glass composition for a glass fiber according to claim 1.

10. A method for producing a glass fiber comprising:
melting a raw material batch mixed so as to be a glass comprising, in mass % on an oxide base, 50 to 65% of $SiO_2$, 0 to 5% of $Al_2O_3$, 0 to 10% of CaO, 12 to 20% of $Li_2O+Na_2O+K_2O$, 0 to 5% of $Li_2O$, 12 to 18% of $Na_2O$, 0 to 1.7% of $K_2O$, 5 to 8.3% of $TiO_2$, 16.5 to 20% of $ZrO_2$, and wherein a total content of $SiO_2$, $Al_2O_3$, CaO, $Li_2O$, $Na_2O$, $K_2O$, $TiO_2$, and $ZrO_2$ is 98% or more as a glass composition, in a glass melting furnace and
continuously drawing the molten glass from a bushing to form it into a fiber, wherein a difference between a drawing temperature and a liquidus temperature is 91° C. or more.

* * * * *